No. 754,134. Patented March 8, 1904.

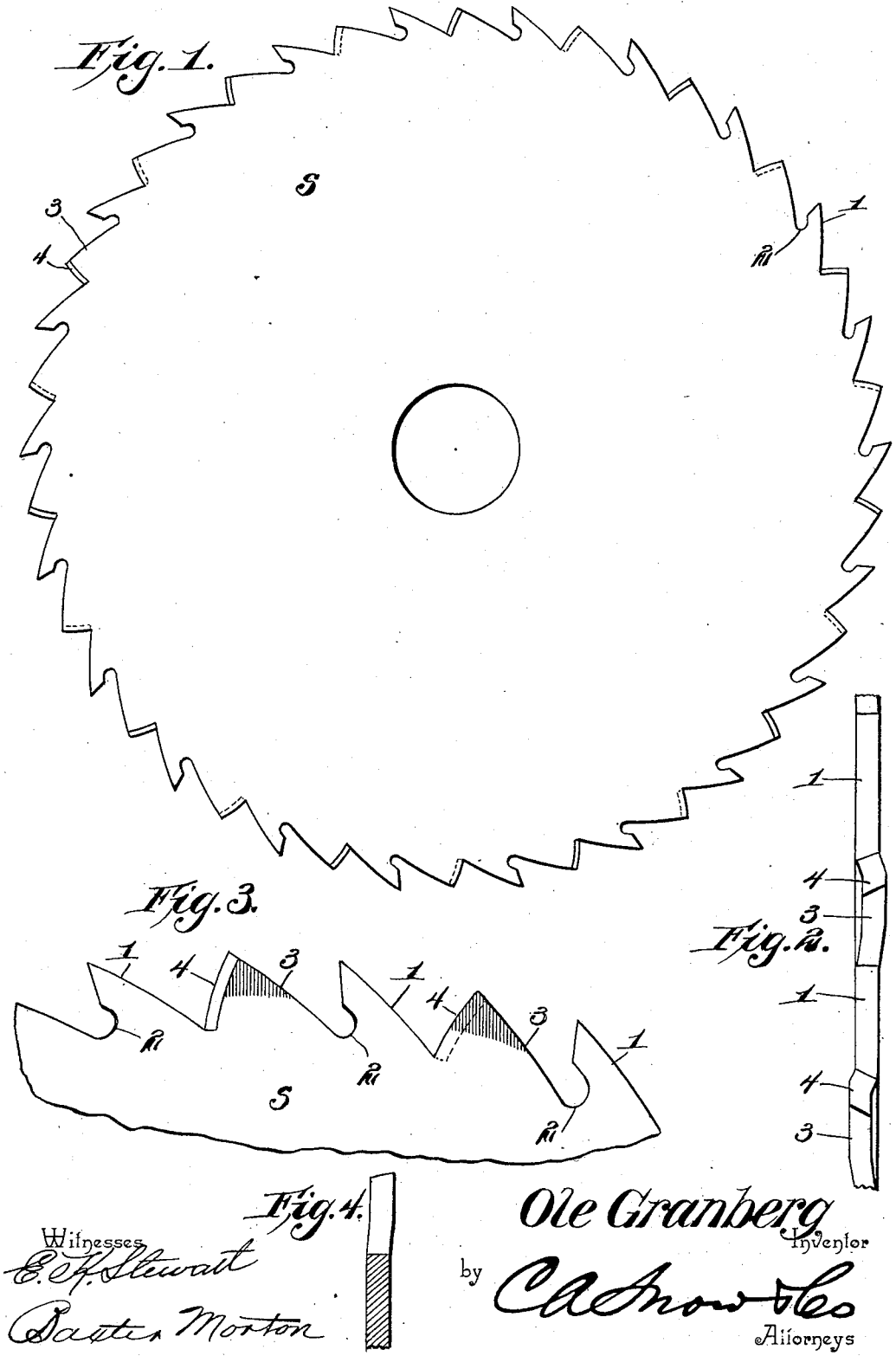

UNITED STATES PATENT OFFICE.

OLE GRANBERG, OF BLAIR, WISCONSIN.

CIRCULAR SAW.

SPECIFICATION forming part of Letters Patent No. 754,134, dated March 8, 1904.

Application filed October 21, 1903. Serial No. 177,967. (No model.)

*To all whom it may concern:*

Be it known that I, OLE GRANBERG, a citizen of the United States, residing at Blair, in the county of Trempealeau and State of Wisconsin, have invented a new and useful Circular Saw, of which the following is a specification.

This invention relates to circular saws, and more especially to circular saws provided with cutting and planing teeth.

The object of the invention is to provide in a circular saw of the character specified an improved arrangement of cutting and planing teeth, whereby the saw will be adapted to operate successfully upon knotty or cross-grained timber and will produce lumber having freshly-sawed surfaces of such smoothness that the lumber may be used without further surfacing in lieu of regular dressed lumber.

As is well known, the absorbing powers of lumber are dependent in great measure upon the character of the surface, smooth surfaces having very small absorbing power as compared with rough-surfaced lumber. It is therefore a desideratum in lumber used in places exposed to the weather to have the surface thereof as smooth as possible in order that the absorption of water and the consequent decay may be reduced to a minimum, and it is also desirable that all lumber which is to be painted have as smooth a surface as possible to reduce the quantity of paint necessary to form a protective coating on the lumber. In some classes of lumber it is customary in order to secure a surface of sufficient smoothness to subject the lumber after sawing to the action of a planing-machine; but in other classes of lumber, as shingles or clapboards, planing is rarely resorted to, and as a consequence the amount of paint used in coating such lumber is much greater than would be necessary if the lumber were smooth surfaced.

The object of the present invention is to produce a circular saw capable of simultaneously cutting and planing the lumber at one operation so perfectly that the freshly-cut surface will be substantially as smooth as that obtained by first sawing the lumber and then subjecting it to the action of a planer of any of the ordinary types.

With the object above mentioned in view the invention consists in the novel circular saw hereinafter described, shown in the accompanying drawings, and particularly described in the appended claims.

In the drawings, Figure 1 is a side view of the entire saw. Fig. 2 is an edge view of a portion of the saw. Fig. 3 is a side view, on an enlarged scale, of a portion of the periphery of the saw, showing the preferred form of the teeth. Fig. 4 is a detail view from the rear of one of the planing-teeth.

Referring to the drawings, in which corresponding parts are designated by similar characters of reference, S designates the body of the saw, provided at its periphery with alternately-arranged cutting and planing teeth. The cutting-teeth (designated 1) are preferably gummed with a round throat or gullet 2 and are filed in the same manner as ordinary rip-saws, with no set or a very small lateral spread set, if any. The planing-teeth are arranged to alternate with the cutting-teeth, which are provided with filed beveled front edges 4, said edges receding or curving slightly backward toward the points. The beveled front edges of the planing-teeth are inclined alternately to the right or left, as shown in Fig. 2, and each tooth is bent outward slightly at or near the middle in setting, so that the extreme point of the tooth shall not project farther beyond the face of the body of the saw than the rest of the teeth. The set of the planing-teeth is, however, very small, and in order that the best results may be obtained from the saw in use it is desirable that the outer surface of each of the planer-teeth be slightly ground by running the saw backward slowly and touching the sides of the teeth lightly with an oilstone or other grinding-surface. In cutting straight-grained timber the cutting-teeth will be preferably a trifle longer than the planing-teeth, as shown in Fig. 1; but for the cross-grained or knotty timber all of the teeth will be preferably of the same length, as shown in Fig. 2, thereby producing a dado cut in smoothness.

With a saw constructed as above described the kerf is carried forward by the cutting or rip teeth 1, but is simultaneously widened by the planing or smoothing teeth 3, so that the saw does not engage with the surfaces of the kerf with any great degree of friction, and the lumber cut by the saw will be smoothed as completely as if passed through a planing-machine. Owing to the diminution of friction between the saw and the sides of the kerf a saving in power in the operation of the saw is effected, and the strain upon the saw is also minimized.

The improved saw is especially adapted for the cutting of shingles on account of the smoothness of the cut, and it is also especially useful in operation upon cross-grained and knotty timber, because there is less tendency to splintering than with saws as heretofore constructed.

Owing to the planing of the lumber at the time of sawing there is great economy in labor resulting from the use of this saw, and owing to the narrowness of the kerf formed by the saw there is very material saving of timber, which is ordinarily wasted in the form of sawdust.

While this invention has been described as embodied in a saw in which the teeth are formed integral with the saw, it will be obvious that saws having inserted teeth may be constructed on the same principle, and I do not limit myself to a saw with integral teeth.

Having thus described the construction and use of my invention, what I claim as new, and desire to secure by Letters Patent, is—

1. A saw having separate cutting and planing teeth, the latter presenting beveled edges formed on convex curves and being bent laterally about midway between the base and point.

2. A saw having separate cutting and planing teeth, the cutting-teeth being of substantially the same length as the planing-teeth and formed without appreciable spread, the planing-teeth being alternately spread to the left and right and presenting planing edges formed on convex curves, each planing-tooth being bent laterally substantially midway between the base and point and having the effective portion of its edge disposed in a plane parallel to the faces of the saw.

In testimony that I claim the foregoing as my own I have hereto affixed my signature in the presence of two witnesses.

OLE GRANBERG.

Witnesses:
A. B. PETERSON,
J. E. MAYER.